United States Patent

Miyajima

[11] Patent Number: 5,455,743
[45] Date of Patent: Oct. 3, 1995

[54] SWITCH PANEL FOR ELECTRONIC DEVICE

[75] Inventor: Satoshi Miyajima, Kanagawa, Japan

[73] Assignee: Sony Corporation, Tokyo, Japan

[21] Appl. No.: 199,093

[22] Filed: Feb. 22, 1994

[30] Foreign Application Priority Data

Feb. 19, 1993 [JP] Japan .................................. 5-030973

[51] Int. Cl.⁶ .............................. H04N 5/64; H05K 7/02
[52] U.S. Cl. ......................... 361/781; 200/296; 200/311; 348/836; 361/732; 361/752; 455/347
[58] Field of Search .................................. 312/7.2, 223.1, 312/223.2; 455/347, 348, 349; 200/293, 294, 296, 303, 308, 310, 311, 314; 361/600, 627, 631, 632, 643, 673, 736, 752, 807, 809, 781, 825, 832; 348/836, 843

[56] References Cited

U.S. PATENT DOCUMENTS

| 3,601,661 | 8/1971 | Kleinhample, Jr. | 317/100 |
| 4,769,741 | 9/1988 | Smith | 361/395 |
| 5,041,944 | 8/1991 | Campisi | 361/399 |
| 5,053,881 | 10/1991 | Campisi | 358/254 |

Primary Examiner—Gerald P. Tolin
Attorney, Agent, or Firm—Hill, Steadman & Simpson

[57] ABSTRACT

A substrate 70 carrying a button plate 54 having an actuating button, and a switch element 72, is arranged at the back side of a front panel of an outer housing 1, and is supported by a bracket 74 screwed to the outer housing 1. The actuating button 52 and the switch element 72 may be positioned easily, while the LED 64 or the remote controlling light receiving section 68 may also be positioned simultaneously. The button plate 54 is not distorted in contradistinction from the case in which the button plate 54 is screwed directly.

11 Claims, 5 Drawing Sheets

SWITCH PANEL FOR ELECTRONIC DEVICE

BACKGROUND OF THE INVENTION

1. Field of the Invention

The present invention relates to a switch panel for an electronic device, such as a television receiver.

2. Description of the Related Art

Various electronic devices are known which have outer housings and electronic circuits accommodated within the outer housings. With certain types of these electronic devices, a plurality of actuating buttons are provided on the front panel of the outer housing for controlling the operation of the electronic circuit. One example of this type of electronic device is a television receiver, such as shown in FIGS. 1, 2 and 3.

Figure 1:
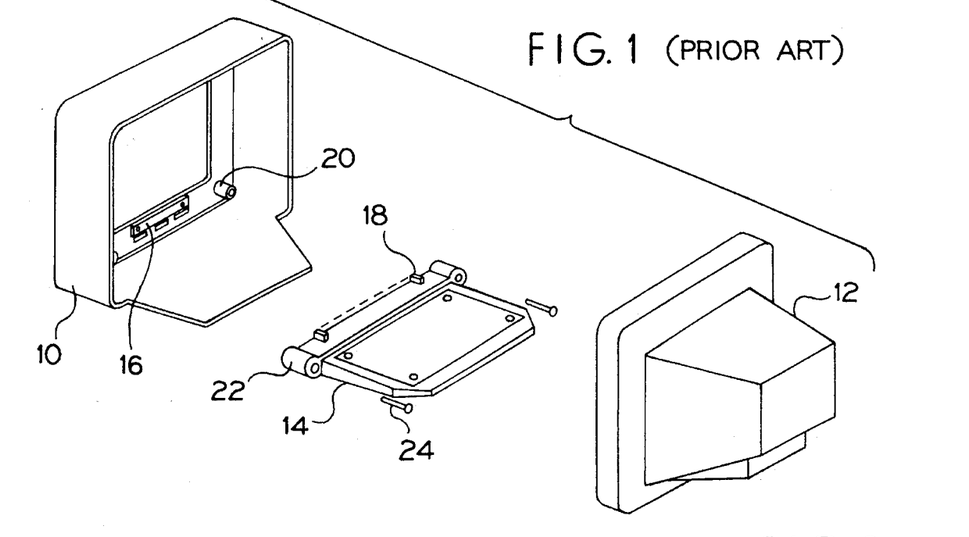
FIG. 1 is an exploded perspective view of a known electronic device, such as a television receiver, having a switch panel via which switches on a circuit board are operated.

In FIG. 1, an example of a television receiver cabinet is shown, including a cabinet front 10, a cabinet back 12, and a main circuit board 14. The inside surface of the cabinet front 10 has a button panel 16 having push buttons that extend through openings in the cabinet front 10 for operating the television receiver. The push buttons actuate switches 18 that are mounted on the main circuit board 14. In the illustrated embodiment, the main circuit board is held in position in the cabinet by bosses 20 in the cabinet front 10 which are engaged by fittings 22 that fit thereover and are held by screws 24.

Figure 2:
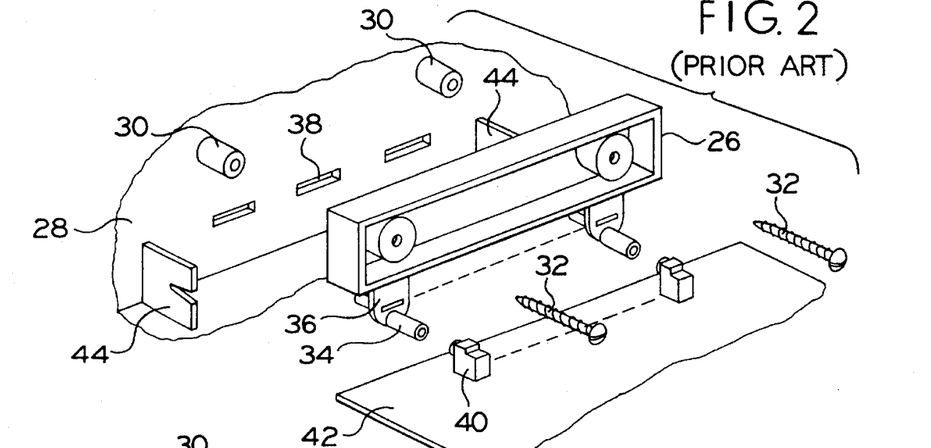
FIG. 2 is an enlarged, partial view of an embodiment of a known switch panel arrangement from inside the device housing, including a button mounting bar.
Figure 3:
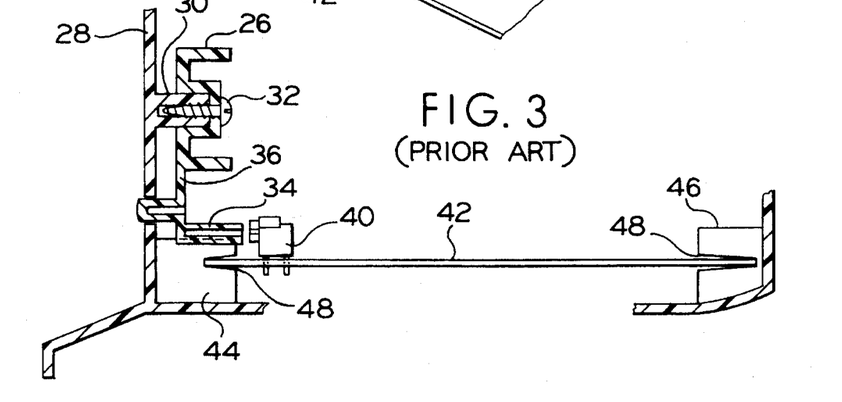
FIG. 3 is a cross section of the known switch panel of FIG. 2, taken in a vertical direction.

In FIG. 2 is shown a close-up exploded view from the inside of a second arrangement of buttons on an electronic device, such as a television. A button mounting bar 26 is supported on an inside surface of a front panel 28 mounted on a pair of bosses 30 and is held in place by screws 32. A plurality of actuating buttons 34 are provided on flexible members 36 connected to the mounting bar 26. The buttons 34 may protrude out of or be recessed into the inside of the front panel 28 via through-holes 38 formed in the front panel 28.

A plurality of switch elements 40 are mounted behind the respective actuating buttons 34 for operation by the actuating buttons as the buttons 34 are pressed. The switch elements 40 are mounted on a circuit board 42 which includes an electronic circuit either as the main circuit board of the electronic device or as an auxiliary circuit board. The switch elements 40 are connected to the electronic circuit so that when the switch elements 40 are actuated, the electronic circuit performs a pre-set operation conforming to the actuated switching elements 34. When the front portions of the actuating buttons 34 are pressed, the flexible members 36 bend and the switch elements 40 are pressed by the rear ends of the actuating buttons 34. The switch elements 40 are thereby actuated by a pressing movement on the buttons 34.

The circuit board 14 or 42 on which the switches 18 or 40 are mounted is supported separately from the actuating buttons 16 or 34. Since, in the above-described electronic devices, the actuating buttons are generally supported by the outer housing, such as by the mounting bar shown in FIGS. 1, 2 and 3, while the switch elements are mounted on a circuit board that is separately mounted, it is extremely difficult to set the relative distance between the actuating buttons and the switching elements to the correct value. In the embodiment of FIG. 1, the switch elements 18 are on the circuit board 14 supported by a chassis or frame accommodated within the outer housing. In FIGS. 2 and 3, the circuit board 42 is mounted in notched ribs 44 and 46 on the inside walls of the housing. In particular, the front cabinet 28 has a pair of vertical ribs below the openings 38 and notches 48 are formed in the ribs 44. The rear cabinet 12 also has a pair of vertical ribs 46 with notches 48 formed therein. The circuit board 42 is fitted into the notches 48 for positioning in the cabinet.

If the relative positioning between the actuating buttons 34 and the switching elements 40 is not correct, proper actuation of the switching elements 40 by the actuating buttons 34 cannot be achieved. That is, if the distance between the actuating buttons 34 and the switch elements 40 is greater than a desired value, there is a risk that the switching elements 40 will not be actuated when the actuating buttons 34 are pressed. Conversely, if the distance between the actuating buttons 34 and the switch elements 40 is smaller than the desired value, there is a risk that the actuating buttons 34 will be perpetually abutted against the switch elements 40, so that no on/off actuation is possible.

With the known switch panels, assembling is complicated because it is necessary to perform separate assembly operations for mounting the actuating buttons in the outer housing or cabinet and for mounting the switch elements in the outer housing.

In addition, if the electronic device is a television receiver, and if the actuating buttons 34 are arranged below the lower edge of the image display of the television, then the switch elements 40 are arranged below the cathode ray tube (CRT). In such case, if dewing occurs on the CRT, there is a risk that water droplets may be dripped onto the switch elements 40 to interfere with the normal operation of the device.

SUMMARY OF THE INVENTION

In view of the above-described status of the art, it is an object of the present invention to provide an electronic device in which the actuating buttons and the switch elements may be accurately positioned relative to each other, in which the assembly operations of the actuating buttons and the switch elements may be simplified and in which the switch elements may be protected against water drops or the like.

For overcoming the disadvantes of the prior art and accomplishing the above and other objects, the present invention provides a switch panel for an electronic device comprising at least one actuating button mounted on the rear, or inside, surface of a front panel of an outer housing or cabinet and positioned relative to the front panel, and a substrate, or circuit board, bracket shaped to sheath a switch substrate, or circuit board, from the back side and having a support for supporting the switch circuit board in position relative to the actuating button. The circuit board bracket is secured to the rear surface of the front panel to sheath the switch circuit board.

According to one embodiment of the present invention, the circuit board bracket also supports the actuating buttons in position. In particular, the actuating buttons are supported on the same mounting bosses as used to position the circuit board bracket on the front panel of the housing. The bottons are positioned between the front panel and the circuit board bracket so that fastening of the circuit board bracket in place also fastens the buttons in place, thereby reducing the assembly steps. In one embodiment, the buttons are on a button plate that also includes means for aligning the printed circuit board with the switches in position relative to the buttons.

With the above-described switch panel, the circuit board bracket is secured to the rear surface of the front panel of the outer casing so as to support the switch circuit board which carries the switch elements and to sheath the switch circuit board in cooperation with the front panel. This enables the switch elements to be positioned with respect to the at least one actuating button which is mounted on the rear surface of the front panel and which is positioned with respect to the front panel. Besides, the circuit board bracket protects the switch elements against contact with moisture, dust, and against inadvertent contact during assembly or repair.

If, with the above-described switch panel, the circuit board bracket is adapted for supporting the actuating buttons as well, the switch elements may be positioned more accurately with respect to the actuating buttons. For example, the actuating buttons may be supported in position on the same mounting bosses as used for the circuit board bracket.

Another embodiment provides the buttons being mounted on an opposite side of the outer housing from the circuit board bracket. The circuit board bracket encloses the circuit board and is mounted to the inside surface of the housing. The buttons are mounted on the outside of the housing in registration with openings through which the switches on the circuit board are actuated. A decorative cover is mounted over the buttons.

BRIEF DESCRIPTION OF THE DRAWINGS

Referring to the drawings, embodiments of the present invention will be explained in detail.

DETAILED DESCRIPTION OF THE PREFERRED EMBODIMENTS

Figure 4:
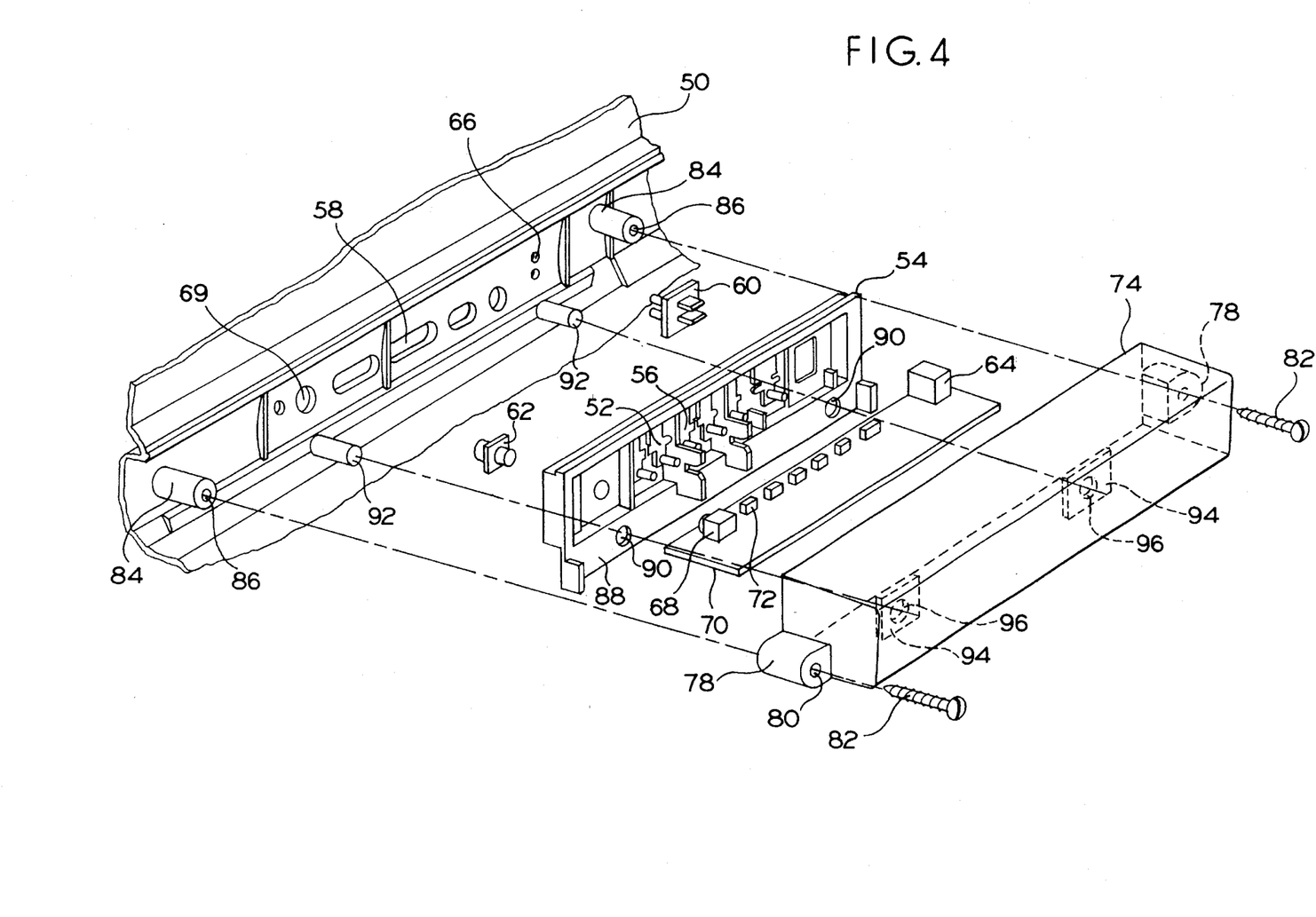
FIG. 4 is an exploded perspective view showing a switch panel for an electronic device according to the present invention.
Figure 5:
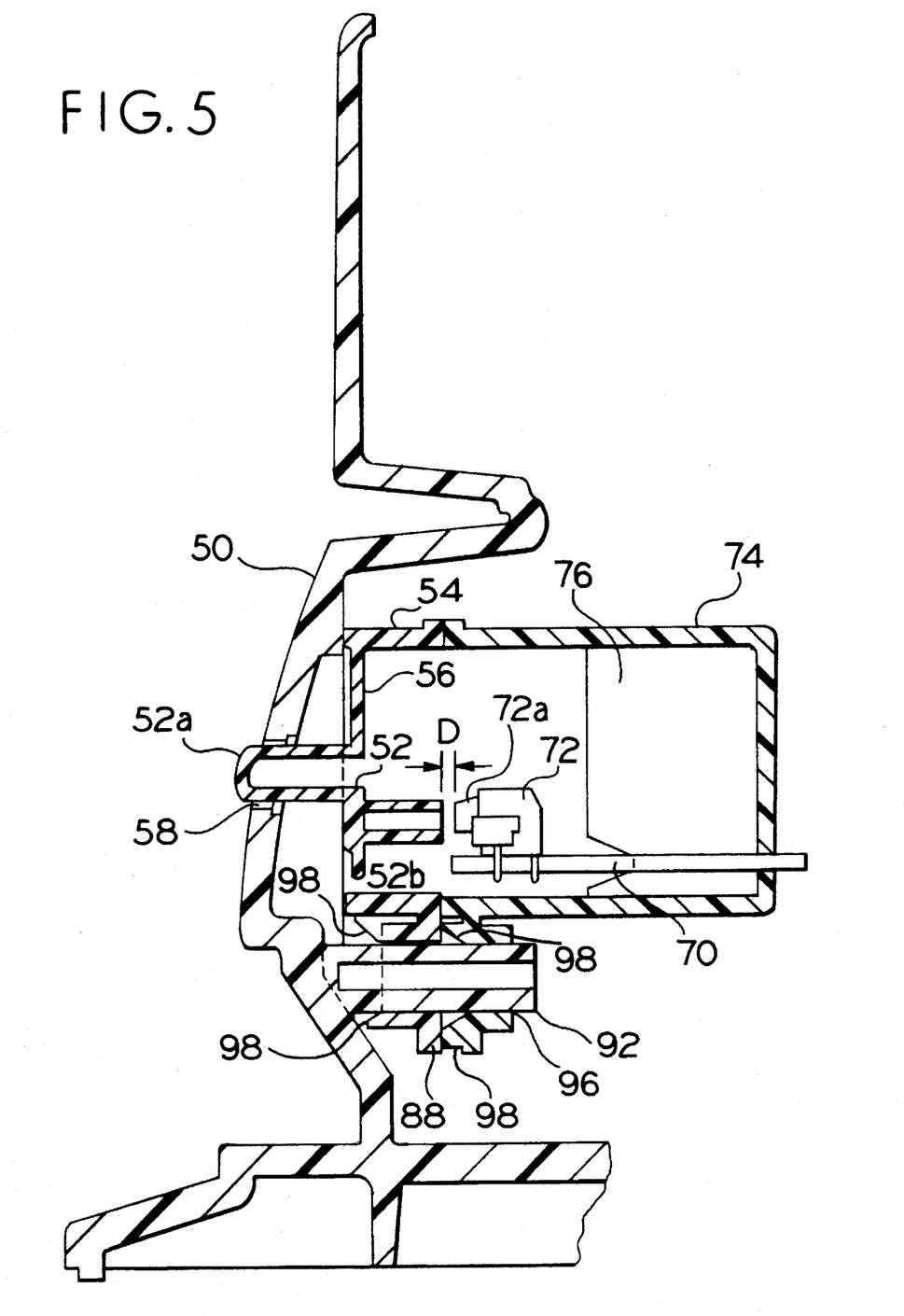
FIG. 5 is a cross-sectional side view showing the switch panel of the electronic device of FIG. 4 according to the present invention.

In the first embodiment of the present invention, as can be seen in FIGS. 4 and 5, the electronic device in which the switch panel is utilized is a television receiver having push-button type controls on the front panel of the cabinet disposed below a cathode ray tube or CRT (not shown) on which the television image is displayed. The present television receiver has an outer housing 50 within which are accommodated one or more circuit substrates, or circuit boards, on which are found several electronic circuits made up of a variety of electronic element mounted on the circuit boards.

The outer housing 50 has an aperture in its front wall through which a picture display section of the CRT is visible from the outside. A plurality of actuating buttons 52 are mounted on the inside surface of the lower portion of the front wall of the outer housing, in other words, the portion of the outer housing disposed below the picture display section of the CRT, as shown in FIGS. 4 and 5. The lower front of the housing is termed a front panel or control panel. The actuating buttons 52 are mounted as one with a substantially planar button plate 54 formed, e.g., of a synthetic material. That is, the button plate 54 is a single unit having a centrally disposed through-hole within which the actuating buttons 52 are mounted. The button plate 54 and the actuating buttons 52 are formed as one with one another via thin plate-shaped sections 56 to permit flexible deformation of the actuating buttons 52 in the direction of the thickness of the button plate 54.

The button plate 54 is positioned with respect to the front wall of the outer housing 50 housing so that a plurality of through-holes 58 in the housing are in registration with the actuating buttons 52. The actuating buttons 52 have front ends 52a which protrude forwardly via the through-holes 58. The actuating buttons 52 may either be recessed in the through-holes 58 or may protrude out through the holes 58 and, when the front ends 52a are pressed, move in a direction into the housing.

A pair of light conducting tubes 60 and an IR (infra red) filter 62 are arranged between the button plate 54 and the outer housing 50. The light conducting tubes 60 are formed of a transparent material for guiding the light beam emanated from a light emitting element 64 mounted at the back of the button plate 54 in a manner as will be explained later. The outer casing 50 has a pair of through-openings 66 at positions in registration with the forward portions of the light guide tubes 60 for conducting the light beams therethrough, while the button plate 54 is formed with through-openings in registration with the rear end portions of the light guide tubes 60. The IR filter 62 is formed of a red-hued transparent material for conducting the IR light beam to a light-receiving element 68 arranged at back of the button plate 54, as will be explained later. The outer housing 50 has a through-hole 69 for the light beam in registration with the forward portion of the IR filter 62. The button plate 54 is formed with a through-hole in registration with the rear end portion of the IR filter 62.

A switchboard, or circuit board, 70 is arranged at the back of the rear side of the button plate 54. On the switchboard 70, there are mounted a plurality of switch elements 72, each associated with the corresponding actuating buttons 52, as well as the light emitting element 64 and the light-receiving element 68. The switchboard 70 is connected to an electronic circuit constituting the present television receiver. The switching elements 72 are employed for selecting and controlling the operation of the electronic circuit of the television receiver. The light emitting element 64 may be an LED or the like and is employed for displaying the operating status of the electronic circuitry based on its light emitting status. The light receiving element 68 is employed for receiving a remote control signal for remote control of the electronic circuit. The remote control signal is transmitted by a carrier wave which is an IR light beam emitted by a remote controller.

A circuit board bracket 74 is mounted at the back of the circuit board, or switch board, 70. The circuit board bracket 74 is formed of a synthetic material or the like and contoured to sheath the switchboard 70 from the back side thereof, that is, it is formed as a box that is open on its front side. The circuit board bracket 74 also has on its inner side a pair of notched ribs 76 in is inserted and supported the switchboard 70. The circuit board bracket 74 has a pair of laterally protruding supporting arms 78, one extending from each side. The supporting arms 78 are formed with screw guide holes 80. The circuit board bracket 74 is secured to the rear side of the front wall of the outer housing 50 by set-screws 82 which extend through the screw guide holes 80 and threaded into the outer housing 50. A pair of screw bosses 84, each having a tapped hole 86 for threaded engagement with the associated set screw 82, are formed unitarily with the outer housing 50 at the rear surface of the front wall of the outer housing 50.

The button plate 54 and the circuit board bracket 74 are assembled and positioned relative to one another in a particularly simple way. The button plate 54 includes an alignment plate 88 extending downward therefrom. The alignment plate 88 has a pair of openings 90 which fit over alignment bosses 92 extending from the inside of the housing 50. The circuit board bracket 74 has a pair of alignment tabs 94 extending downward therefrom, each with an opening 96 that likewise fits over the alignment bosses 92. Therefore, both the buttons 52 in the button plate 54 and the switches 72 on the circuit board 70 as a result of being held in the circuit board bracket 74 are supported and aligned relative to the same alignment bosses 92. The circuit board bracket 74 presses the button plate 54 against the inside wall of the housing 50 at several locations. The proper relative alignment and spacing of the buttons 52 and the switches 72 is, thus, garanteed.

For ease of assembly, both the alignment plate 88 and the alignment tabs 94 have beveled guide fins 98 about the openings 90 and 96, as seen in FIG. 5. The guide fins 98 extend radially in four directions, for example, from the openings 90 and 96. The portions of the guide fins 98 closer to the openings 90 and 96 are beveled toward the openings to guide the alignment plate 88 and the alignment tabs 94, respectively, over the alignment bosses 92. Assembly of the switch panel is thereby quicker and easier.

The circuit board bracket 74 is secured to the rear surface of the front wall of the outer housing 50 by the set screws 82 for positioning and supporting the switch circuit board 70 by the above-mentioned support. The bracket 74 also acts in cooperation with the front wall of the outer housing 50 to enclose the circuit board 70. The circuit board bracket 74, as the result of it being secured to the outer housing 50, supports the button plate 54 in position relative to the outer housing 50. That is, the button plate 54 is positioned with respect to the outer housing 50 only in the direction of the major surface of the button plate 54 by the outer peripheral portions of the button plate 54, rather than in the direction away from the outer housing 50. The circuit board bracket 74 holds the button plate 54 in cooperation with the outer housing 50 for supporting the button plate 54.

Consequently, with the present electronic device, the button plate 54 and the switch substrate 70 may be supported in position solely by the operation of securing the circuit board bracket 74 to the outer housing 50, thereby simplifying the assembling operation. Since the button plate 54 is held and supported by the circuit board bracket 74 and the outer housing 50, the actuating buttons 52 may be accurately positioned at the pre-set positions relative to the switches 72.

With the circuit board bracket 74 secured in this manner to the outer housing 50, rear end portions 52b of the actuating buttons 52 and thrust portions 72a of the switch elements 72 face one another. Since both the button plate 54 and the switch circuit board 70 are positioned by the circuit board bracket 74, the distance between the end surfaces of the rear end portions 52b and the forward ends of the thrust portions 72a as indicated by a spacing D in FIG. 5 is accurately set to a pre-set distance. Consequently, with the present electronic device, the thrust portions 72a of the switch elements 72 may always be pressed satisfactorily via the rear end portions 52b by pressing the forward end portions 52a of the actuating button 52 in the rearward direction.

In addition, with the present electronic device, since the circuit board 70 is sheathed by both the bracket 74 and the outer housing 50, the circuit board 70 is protected against atmospheric air so that water droplets or the like are not dripped onto the circuit board 70 even in case of dewing by the CRT.

Figure 6:
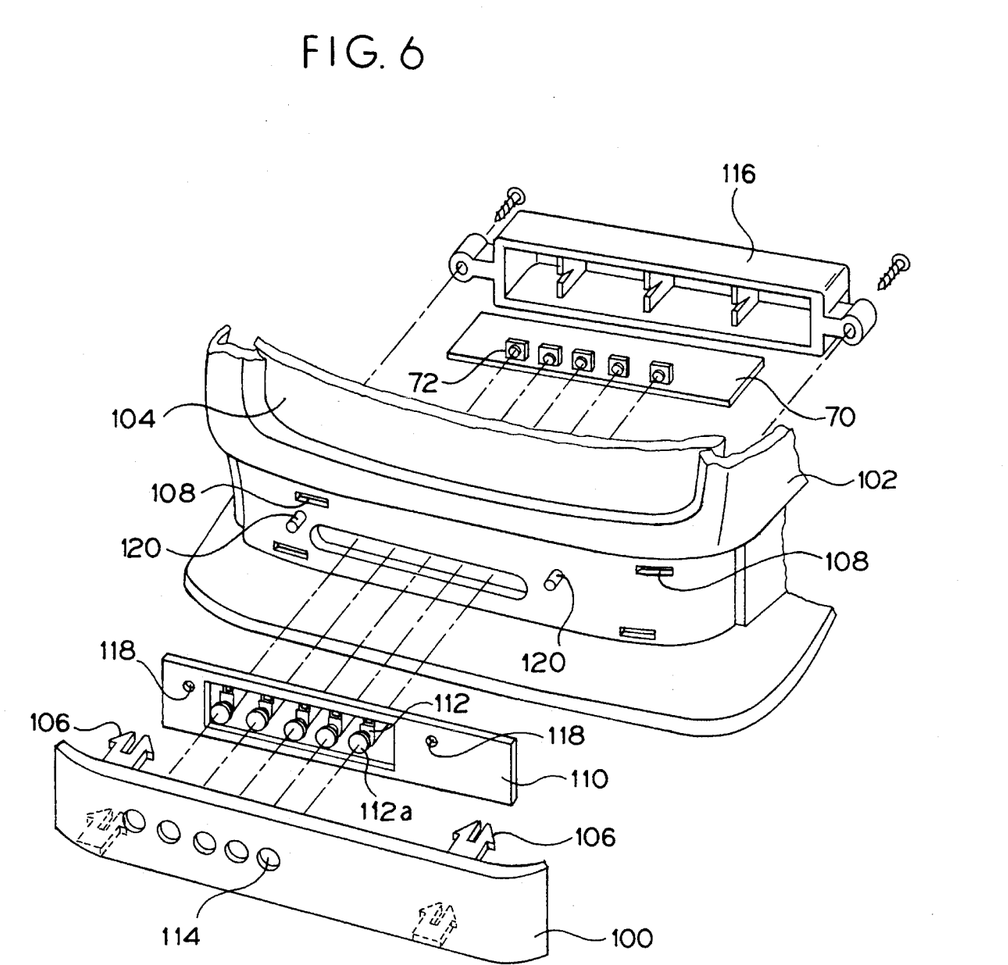
FIG. 6 is an exploded perspective view showing a switch panel of an electronic device according to a modified embodiment of the present invention.
Figure 7:
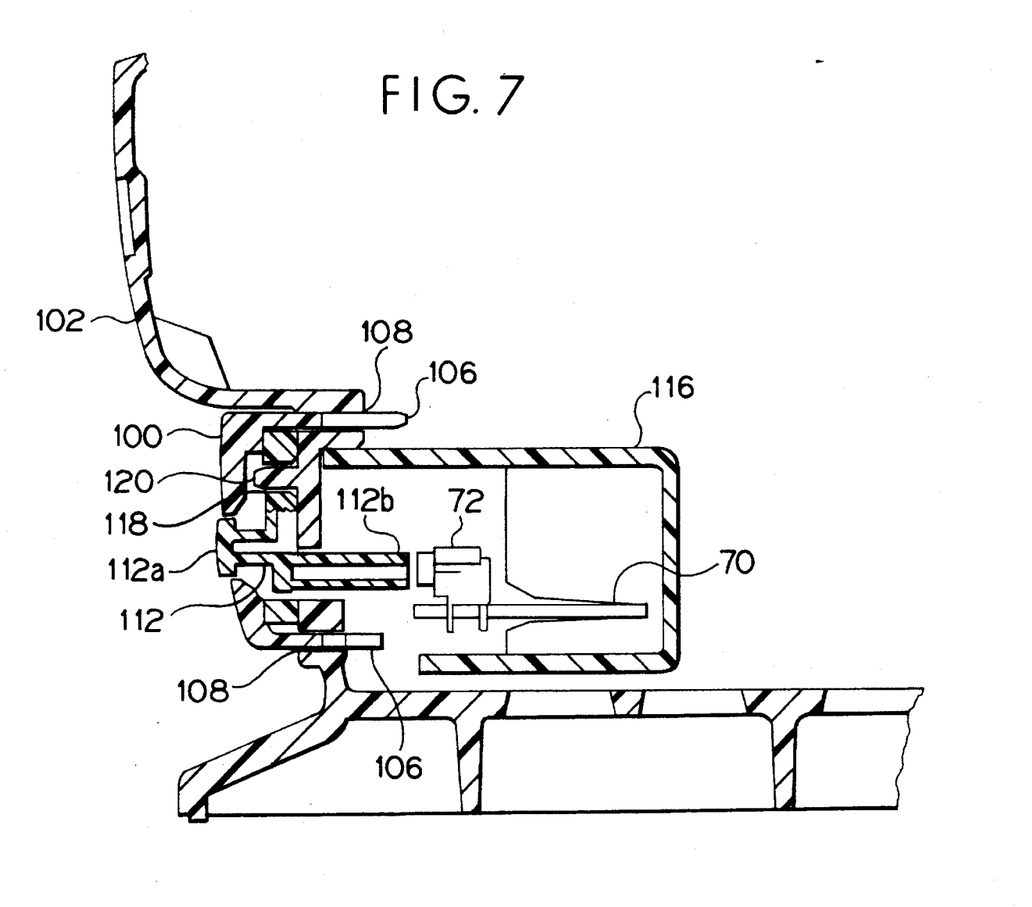
FIG. 7 is a cross-sectional side view showing a switch panel of the electronic device shown in FIG. 6.

Referring to FIGS. 6 and 7, with the electronic device according to the present invention, a front panel 100 that is distinct from the outer housing 102 may be mounted on the front wall section of the outer housing 102, as shown in FIGS. 6 and 7. The front panel 100 is formed as a substantially planar member which may be mounted at a position below the picture display section 104 of the CRT at the front surface of the outer housing 102. The front panel 100 has on its rear surface a two pair of mounting prongs 106. The front panel 100 is attached to the front wall of the outer housing 102 by fitting the mounting prongs 106 into two pair of corresponding mounting holes 108 formed in the front wall of the outer housing 102. The front panel 100 is thereby snapped into place.

A button plate 110 is mounted behind the front panel 100, that is between the front panel 100 and the front wall of the outer housing 102. At this time, the forward end portions 112a of the actuating buttons 112 protrude forwardly via through-holes 114 formed in the front panel 100 in registration with the actuating buttons 112. The button plate 110 is positioned relative to the outer housing 102.

The above-mentioned switch substrate 70 is mounted at the back of the front wall of the outer housing 102. The switch substrate 70 is supported in position by a substrate bracket 116 secured to the outer housing 102. The rear end portions 112b of the actuating buttons 112 have the rear ends of the rear end portions 112b thereof protrude via a throughhole 119 formed in the front wall of the outer housing 102 for facing the thrust portions 72a of the switch elements 72.

With the above-described electronic device, the distance between the rear ends of the rear end portions 112b of the actuating buttons 112 and the forward ends of the thrust portions 72a of the switch elements 72 is accurately maintained at a pre-set value. Consequently, with the present electronic device, the thrust portions 72a of the switch elements 72 may always be thrust satisfactorily via the rear end portions 112b by thrusting the forward end portions 112a of the actuating button 112 in the rearward direction. Further, with the present electronic device, the substrate plate 70 is sheathed by the substrate bracket 116 and the outer housing 102 and hence is protected against atmospheric air. The bracket 116 is secured in place by screws extending through support arms into screw bosses, as in the first embodiment.

The button panel 110 is accurately positioned by openings 118 that fit over alignment bosses 120 on the outer surface of the housing 102. The front panel 100 presses the button plate 110 against the front surface of the housing 102, as can be seen in FIG. 7. Preferably, the alignment bosses 120 are slightly conical to ensure that no transverse movement of the button plate 110 occurs when it is secured in position.

The present switch panel, including the button plate 110, the switch substrate 70 and the substrate bracket 116 may be employed in conjunction with various different electronic devices, that is with electronic devices having the outer housings 102 of different shapes or constitutions.

With the above-described electronic device of the present invention, the substrate bracket, secured to the rear surface of the front panel of the outer housing, supports the switch substrate mounting the switch elements. Besides, the substrate bracket sheathes the switch substrate in cooperation with the front panel.

Consequently, with the present electronic device, the switch elements may be positioned by the substrate bracket with respect to at least one actuating button which is mounted on the rear surface of the front panel and which is positioned with respect to the front panel. Besides, it is possible with the substrate bracket to protect the switch elements against atmospheric air.

Furthermore, if the substrate bracket of the above-mentioned electronic device is adapted for supporting the actuating buttons as well, the switch elements may be positioned more accurately by the substrate bracket with respect to the actuating buttons.

That is, the present invention provides an electronic device whereby the actuating buttons and the switch elements may be correctly positioned relative to each other, the assembling operation for the actuating buttons and the switch elements may be facilitated, and whereby the switch elements may be protected against water droplets or the like.

Although other modifications and changes may be suggested by those skilled in the art, it is the intention of the inventors to embody within the patent warranted hereon all changes and modifications as reasonably and properly come within the scope of their contribution to the art.

We claim:

1. A switch panel assembly for an electronic device having an outer housing with a front panel, comprising:
    a switch button plate mounted at the front panel of the outer housing;
    at least one actuating button on said switch button plate, said at least one actuating button being flexibly movable relative to said switch button plate and to the front panel of the outer housing and positioned relative to said front panel,
    a switch element arranged on a switch substrate positioned in back of and in association with said at least one actuating button, said switch element being activatable by flexible movement of said at least one actuating button, and
    a substrate bracket sheathing said switch substrate from a back side thereof within the outer housing and having a support in supporting engagement with said switch substrate, said substrate bracket being secured to the rear surface of the front panel and sheathing said switch substrate in cooperation with the front panel.

2. A switch panel assembly as claimed in claim 1, wherein said substrate bracket also supports said switch button plate.

3. A switch panel assembly as claimed in claim 2, wherein said switch button plate is supported between said substrate bracket and the front panel.

4. A switch panel assembly as claimed in claim 1, wherein said switch substrate extends substantially perpendicular to the front panel, and wherein said substrate bracket further comprises substrate engaging means for supporting said substrate in stationary engagement relative to said switch button plate and to said substrate bracket.

5. A switch panel assembly as claimed in claim 4, wherein said substrate engaging means comprise notched ribs in said substrate bracket extending substantially perpendicular to a plane of said substrate, notches in said notched ribs engaging said substrate.

6. A switch panel assembly as claimed in claim 1, wherein the front panel includes bosses extending substantially perpendicularly from a rear surface,
    said switch button plate comprising first boss engagement openings engaging said bosses, and
    said substrate bracket comprising second boss engagement openings engaging said bosses with said first boss engagement openings between the front panel and said second boss engagement openings.

7. A switch panel assembly as claimed in claim 1, wherein said substrate bracket is attached to the front panel of the outer housing and is free of a rear of the outer housing, and further comprising fasting means for fastening said substrate bracket to the front panel.

8. A switch panel for an electronic device, comprising:
    a housing of the electronic device having a panel with at least one button opening;
    a button plate having at least one actuating button each having an activated and a non-activated position and being mounted on a surface of said panel of said housing with said at least one actuating button accessible for actuation through said at least one button opening, said at least one actuating button being selectively movable between said activated position and said non-activated position, said button plate including a first circuit board engaging means for engaging and positioning a circuit board at a predetermined position relative to said button plate at a side opposite said panel;
    a circuit board mounted in said housing and engaged and positioned in said predetermined position in said first circuit board engaging means;
    at least one switch element each mounted on said circuit board and arranged at a predetermined distance from a corresponding one of said at least one actuating button when the corresponding actuating button is in the non-activated position so that said at least one switch is activated when said at least one actuating button is moved to its actuating position; and
    a circuit board bracket within said housing connected to said Ranel, said circuit board bracket including second circuit board engaging means for engaging and positioning said circuit board, said circuit board bracket substantially enclosing said circuit board within said housing.

9. A switch panel as claimed in claim 8, wherein said circuit board bracket is connected to said button plate.

10. A switch panel as claimed in claim 8, wherein said panel includes bosses extending inwardly;
    said button plate includes means defining first boss engagement openings fitting over said bosses;
    said circuit board bracket includes means defining second boss engagement openings fitting over said bosses after said means defining first boss engagement openings so that said means defining first boss engagement openings is between said panel and said means defining second boss engagement openings.

11. A switch panel as claimed in claim 10, wherein said first means defining boss engagement openings include beveled guides directing said bosses into said boss engagement openings during assembly, and said second means defining boss engagement openings include beveled guides directing said bosses into said boss engagement openings during assembly,

* * * * *